June 5, 1962 D. L. HINGS ET AL 3,037,900
METHOD AND MACHINE FOR APPLYING THERMOSETTING RESIN
Filed March 12, 1956 2 Sheets-Sheet 1

INVENTORS
Donald L. Hings
BY Donald P. Hings

Woodling and Krost, attys.

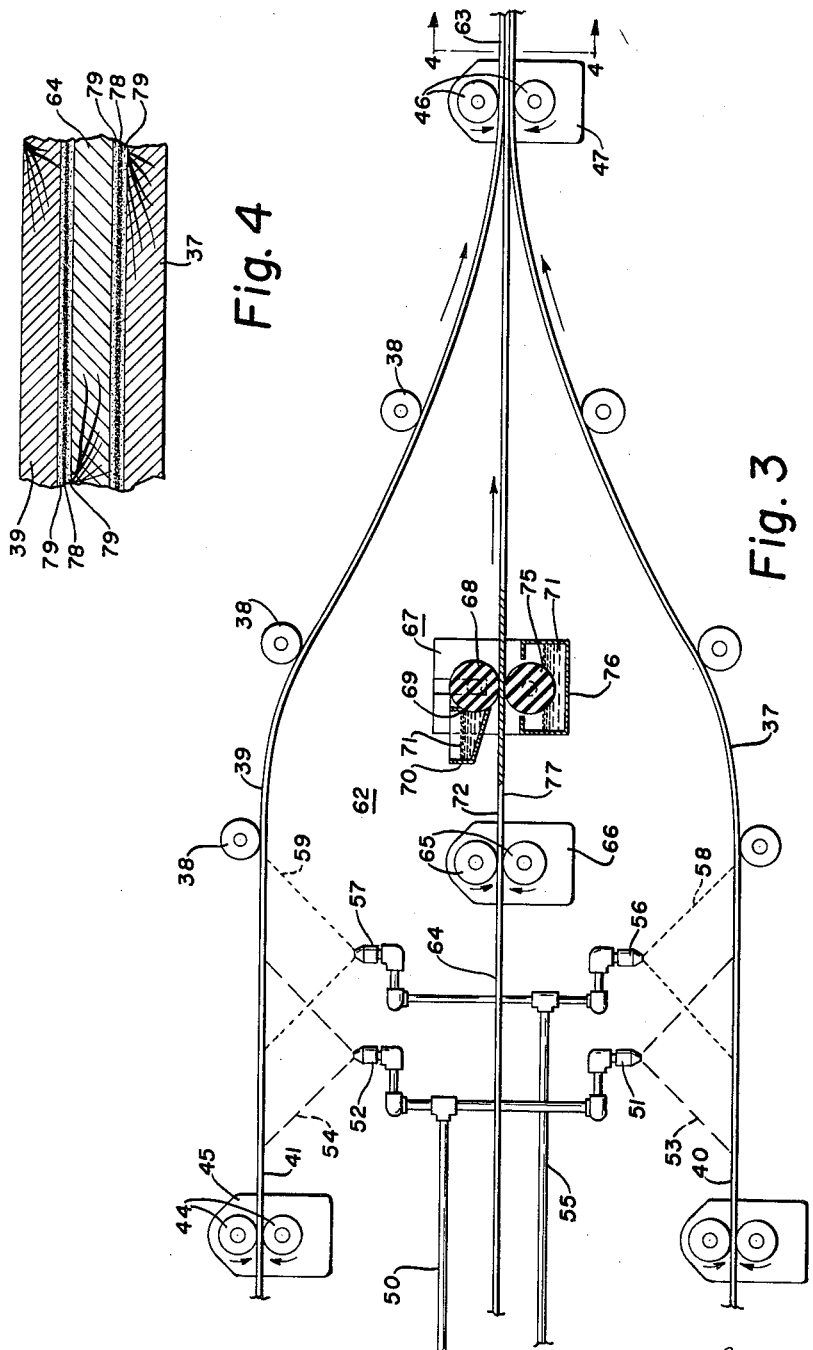

United States Patent Office 3,037,900
Patented June 5, 1962

3,037,900
METHOD AND MACHINE FOR APPLYING THERMOSETTING RESIN
Donald L. Hings and Donald P. Hings, both of 281 N. Howard Ave., Vancouver, British Columbia, Canada
Filed Mar. 12, 1956, Ser. No. 570,776
20 Claims. (Cl. 156—310)

The invention relates in general to application of thermosetting resins and more particularly to a means for achieving a viscous air tight seal on the surfaces of the thermosetting resin so as to obtain a complete exotherm or cure of the resin.

This application is a continuation-in-part of application, Serial No. 374,899, filed August 18, 1953, for Method and Machine for Applying Thermosetting Resin, now abandoned.

Thermosetting resins, such as polyester resins, have previously been used in application as a thin film or coat upon a big sheet or surface. The problem in the prior art was that when this resin was brushed or sprayed as a coating, and applied like a varnish or a paint, the air would damage or prevent a surface cure. The main body of the coating would cure internally, but the external surface in contact with the air would remain tacky unless sufficient heat was applied to cure the surface in less than about ten or fifteen minutes. This required temperatures in the neighborhood of one hundred fifty degrees Fahrenheit. The prior art met this problem by applying a film of cellophane over the surface to exclude air, and this air tight cellophane sheet produced a proper surface cure. The cellophane was later removed. This was a tricky and costly method, but it did produce a surface hardness and moisture resistance that was much superior to a cure of the thermosetting resin without this cellophane.

The present invention relates to a means of applying a light spray or brush coat on the thermosetting resin to exclude air, and this spray or brush coat is also moisture resistant. This spray or brush coat may be considered a viscous air tight seal and includes a mixture of chlorinated rubber and styrene. This mixture may be applied as a film as thin as only a few microns and prevents air damage and permits a surface cure equal to that obtained by application of cellophane. The viscous air tight seal may be applied immediately or after a partial cure has begun called gelling and will still permit a cure of the exterior surface.

An object of the invention is to provide a means for applying a coat of thermosetting resin wherein the thermosetting resin may be a slow cure mix which will not harden in the working container within a working day, and yet the curing or exotherm period may range in the order of minutes or even seconds.

Another object of the invention is to extend the pot life of thermosetting resin, yet permit its practical use in mass production.

Still another object of the invention is to provide a pigmented thermosetting resin which may be used and applied as a paint in any of the paint applications and which has all the permanent properties of a thermosetting polyester resin.

Another object of the invention is to provide a means for surfacing a sheet with thermosetting resin under poor weather conditions which would preclude normal exotherm or cure of the resin.

Another object of the invention is the application of thermosetting resins that utilize a catalyst and chemical promoter to produce an exotherm or internal cure.

Another object of the invention is to provide for the utilization of two different mixes of resin having an individual pot mix cure period in excess of a working day and have, when combined, a surface cure period in the range of seconds or minutes.

Another object of the invention is to apply thermosetting resin mixtures in a manner to obtain promoter-catalyst mixing and curing on the surface that is under process.

Another object of the invention is to provide a catalyzed resin layer on the material being surfaced and a promoter resin layer intermixed with the catalyzed layer, and producing an exotherm or interchemical reaction to thereby increase the rate of the thermoset and produce a hard resin bond.

Another object of the invention is to dispense suitably mixed layers of promoted and catalyzed resin to form a viscous surface for bonding together layers of porous or film material without the aid of exterior heat.

Another object of the invention is to apply the resins in a manner to create the exotherm reaction in the absence of air thereby producing a hard and more complete surface cure.

Another object of the invention is to provide a catalyzed resin layer on the material surface closely followed by a promoted resin layer to assure normal cure and bonding of the resin and material surfaces.

Another object of the invention is to cover bonding surfaces of laminates with catalyst mixed resins and activate these resins with promoted resins, the resins issuing from separate sprays which sprays may be either partially or entirely intermixed.

Another object of the invention is to spread catalyzed thermosetting resin on porous, fibrous, or film surfaces and to sandwich a thin layer of promoted resin between two of the surfaces to produce an exotherm or heat reaction to thereby bond the surfaces.

Another object of the invention is to spread a bonding resin layer for laminates that may be suitably filled or pigmented for increased gelatinization for uneven fibrous or porous surfaces.

Another object of the invention is to simplify mixing adjustments of catalyzed resin spray and promoted resin spray by pigmenting the two sprays with different primary color dies to produce a representative secondary color on the surface after the intermixed spraying.

Other objects and a fuller understanding of this invention may be had by referring to the following description and claims, taken in conjunction with the accompanying drawings, in which:

FIGURE 3 is a side view of a machine bonding together three sheets or laminates; and FIGURE 4 is an enlarged sectional view on the line 4—4 of FIGURE 3.

Figure 1:
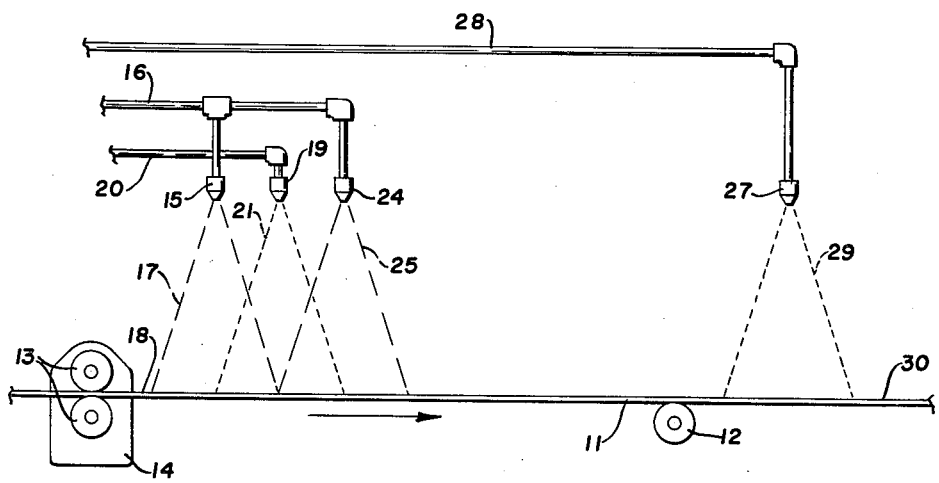
FIGURE 1 is a side view of a machine for surfacing sheet material.

FIGURE 1 shows sheet material 11 which is being processed. This sheet material may be any film or sheet with the sheet being porous, fibrous, or solid. The surfacing treatment is an application of a thermosetting resin and may be for the purpose of protecting the sheet from the weather. In this respect it is similar to varnish or paint applications on a surface of a sheet and for this purpose the thermosetting resin may be pigmented.

The sheet material 11 is shown as being supported on a roller 12 and being driven forward by drive rollers 13 energized from any suitable source diagrammatically illustrated as the drive means 14. The first nozzle 15 is supplied with a mixture of thermosetting resin and catalyst from a supply line 16. This nozzle 15 throws a spray 17 which is first to cover the bonding surface 18 of the sheet material 11 as it is advanced by the drive means 14.

This thermosetting resin may be any of the usual forms, such as polyester resins, which undergo an exotherm or cure by the application of heat sufficient to form long chain molecules which transform it so that it is relatively solid rather than relatively liquid.

In practice an example of suitable thermosetting resins which may be used are the polymerizable unsaturated polyhydric alcohol-polycarboxylic acid polyesters which are the so-called "linear" polyesters, such as those in which there is only very slight cross-linking in the polyester molecules, which is evidenced by the fact that such polyesters are soluble in such solvents as acetone. These polyesters are formed namely by esterification of a dihydric alcohol and a dibasic acid. Such polyesters are really only "substantially" linear since it is not possible to avoid all cross-linking, at least through the unsaturated bonds in the polyester molecule. A suitable commercial example of resin which may be utilized in the first coating 11 is a resin manufactured by Naugatuc Chemicals, a division of Dominion Rubber Co. Ltd., Elmira, Ontario, sold under the caption "Vibrin 117–T Light Stabilized Control No. D–1475."

A typical example of such a polyester is a product prepared by the reaction of an unsaturated dicarboxylic acid such as maleic, fumaric, itaconic, citraconic or mesaconic acid, maleic anhydride is also widely used, with a dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monester (in either the alpha or beta position), such as monoformin or monoacetin, any monether of glycerol with a monohydric alcohol, such as monomethylin or monoethylin, or any dihydroxy alkane in which the hydroxy radicals are attached to the carbon atoms that are primary or secondary or both, in the series from dihydroxy butane to dihydroxy decane. A suitable polyester may be like that as taught by Patent No. 2,632,752.

Instead of a single polybasic acid, a mixture of polybasic acids may be employed, such as a mixture of an unsaturated dibasic acid with a polybasic acid containing more than two acid radicals, such as citric acid. A mixture of polyhydric alcohols may be employed, such as a mixture of dihydric alcohol with a polyhydric alcohol containing more than two alcohol radicals, such as glycerol. This is suitably taught by Patent No. 2,632,751.

The polymerizable polyesters of this invention are those which are capable of polymerizing to a hard, infusible state, either by addition polymerization among themselves or also with the help of some other compatible polymerizable monomeric compound. This polymerization is usually brought about with the addition of a suitable catalyst and in addition, in some conditions, a suitable accelerator or promoter as they are referred to in the art, and without giving off substantial undesirable byproducts during the polymerization reaction.

In some instances, the polyester type resins contain a thinner or a suitable polymerizable unsaturated monomeric substance. The properties of finished articles produced by polymerization of a composition embodying the invention are better when the composition contains a polymerizable, unsaturated monomeric substance, so that such a substance is ordinarily used in the composition. It is believed that because of their large size the polyester molecules are not mechanically well adapted to polymerize with one another and that the better properties of finished articles produced from a composition containing a polymerizable unsaturated monomeric compound are due to the superior curability of such a composition. The monomeric compound is believed to impart better curability to the composition because of its ability to cross-link the unsaturated polyester molecules by copolymerizing with such molecules.

Examples of suitable polymerizable monomeric compounds include diallyl phthalate, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis-(allyl lactate), phthalyl bis-(allyl lactate), fumaryl bis-(allyl glycolate), carbonyl bis-(allyl glycolate), carbonyl bis-(allyl silicylate), tetra-(allyl glycolate) silicate, tetra-(allyl lactate) silicate, styrene, vinyl acetate, methyl methacrylate and methyl acrylate.

Examples of suitable solvent type materials are glycol-monomethyl ether, glycol-monoethyl ether and glycol-monobutyl ether. These materials are suitably taught by Patent No. 2,532,498.

Methyl ethyl ketone peroxide catalyst is preferably used, however other suitable peroxide type catalysts may be used including, succinyl peroxide, benzoyl peroxide, tert-butyl perbenzoate, di-tert-butyl perphthalate, acetyl peroxide, peracetic acid, perbenzoic acid, toluyl peroxide, p-bromobenzoyl peroxide, anisoyl peroxide, chloracetyl peroxide, acetyl benzoyl peroxide, diacetyl peroxide, and furoyl peroxide. Certain organic ozonides also increase the rate at which addition polymerization of olefinic double bonds takes place; examples are di-isopropyl ozonide and di-isobutylene ozonide. Organic hydroperoxide polymerization catalysts may also be used; examples are tetralin hydroperoxide, 1-hydroxy-cyclopentyl-hydroperoxide-1. These suitable catalysts are fully disclosed in Patent No. 2,532,498.

Although any amount of a catalyst sufficient to cause the polymerization to proceed at a reasonable rate can be used in carrying out the polymerization reaction, the usual "catalytic amounts" are normally employed. For example, it is ordinarily advantageous to use an amount of a polymerization catalyst that is at least about 0.05 percent of the composition to be polymerized. It is usually preferable that the amount of catalyst used be at least about 0.1 percent of the composition to be polymerized. Ordinarily, it is advisable that the amount of catalyst used be not more than about 5 percent of the composition to be polymerized, and most desirable that the amount of catalyst be not more than about 3 percent. A suitable commercial example of catalyst is methyl ethyl ketone peroxide in dimethyl phthalate as made by the Lucidal Division, Novadel-Agene Corp., Buffalo, N.Y., and sold under the name "Lupersol DDM."

A second nozzle 19 is supplied with a mixture of thermosetting resin and a chemical promoter or accelerator from a supply line 20. The thermosetting resin furnished the nozzle 19 may for convenience be the same thermosetting resin as furnished to the nozzle 15. In any event, the two resins should be compatible so that they will intermix and be able to cure. The second nozzle 19 has a spray 21 to cover the bonding surface of the sheet material 11 in a manner which may be more or less overlapped with the first spray 17. As shown in FIGURE 1, the overlap is preferably fifty percent. Cobalt naphthenate has been found to be particularly useful as a promoter or accelerator when combined with peroxide type catalysts, although other accelerators may be used when special curing systems are required. A suitable commercial example of this acelerator is sold by the Nuodex Products Co., Inc., Elizabeth, N.J., under the name "Nuodex" cobalt accelerator.

A third nozzle 24 is also supplied by the supply line 16, and hence, the spray 25 emitted by the nozzle 24 covers the bonding surface 18 of the sheet material 11 with a mixture of thermosetting resin and catalyst. The spray 25 may overlap the spray 21 and, as shown in FIGURE 1, preferably has approximately a fifty percent overlap.

Somewhat removed from the nozzles 15, 19 and 24, a fourth nozzle 27 is provided in the machine and supplied from a supply line 28. This fourth nozzle 27 emits a spray 29 which covers the intermixed resin promoter and catalyst with a material 30 which forms a viscous air tight seal.

It has been found that by excluding air from the surface of the thermosetting polyester type resin or in other words excluding air from the sprayed mixture which includes sprays 17, 21 and 25 during its setting up or polymerization period, that one is able to obtain a much more uniform and smooth finish. The principal function of the material 30 or as it may otherwise be referred to as an air excluding overcoat is to exclude air from contacting the outer surface of the thermosetting resin. The material 30 or air excluding coating may be of several types. Suitable examples constitute the use of either a latex solution or a halogenated rubber mixture. The latex and water dispersions thereof are dispersions of rubber particles in water. The latex solution may be either of the natural or synthetic type. After the material 30 has been sprayed on and hardened it may be removed by any suitable means such as washing off by water. Halogenated rubbers are well recognized materials which are available from many commercial sources. They are products obtained by halogenating natural rubber or synthetic rubbers of the diene type such as the copolymers of butadiene and styrene or butadiene and acrylonitrile. The preparation and properties of halogenated rubbers are well known and have been recorded in many publications and patents including the following: Ellis, "The Chemistry of Synthetic Resins," chapters 54 and 55; and Powers, "Synthetic Resins and Rubbers"; and Patent Numbers 2,302,-583, 2,401,194 and 2,424,920. Chlorinated natural rubber is much the preferred member of the class of halogenated rubbers. This is produced by the action of chlorine on raw or vulcanized rubber and may contain from 30 percent to 80 percent chlorine, depending on the method of manufacture. The viscosity of the chlorinated rubber may vary widely, but it is preferred to employ a material of relatively low viscosity. These chlorinated rubbers may be taken up in various solvents in order to facilitate their application in many instances. Examples of suitable solvents are benzene, toluene, and carbon tetrachloride. An example of a suitable chlorinated rubber mixture for utilization in accordance with this particular invention may be prepared from 4.5 pounds of styrene mixed with 1.5 pounds of chlorinated rubber and thinned with 7.5 pounds of carbon tetrachloride. When latex coatings are used as the air excluding coat or material 30, the latex coatings serve specifically no mechanical utility after the thermosetting resin is cured or polymerized to its hard infusible state and may subsequently be washed or peeled off. The chlorinated rubber coating however provides a very hard surface which is highly resistant to alkaline conditions and is also an excellent electrical insulator. This film 30 may be applied immediately after the combined sprays 17, 21 and 25; or it may be delayed until after there occurs a partial cure called gelling. Since it has been determined that the presence of air prevents a complete surface cure and leaves the surface tacky even though the inner parts of the intermixed resins are cured, the present invention is directed to applying this film 30 before a major portion of the exotherm or cure has been completed. Thus, in FIGURE 1 the distance between the nozzle 27 and the three nozzles 15, 19, and 24 should be so related to the speed of movement of the sheet material 11 so that only a minor portion of the cure is accomplished before the film 30 is applied.

The film 30 may alternatively be a paraffin solution which will rapidly form a viscous air tight seal. This surface sealer or film permits complete curing and prevents the uneven partial surface cure which would otherwise be obtained if the bonding resins were cured in contact with the air.

The spray 17 is a mixture of thermosetting resin and catalyst, workable examples of which have been given hereinabove. This coats the bonding surface 18 and fills the pores, if any, in such sheet material 11. The spray 21 is a mixture of thermosetting resin and chemical promoter, examples of which have been given. The chemical promoter and catalyst, when intermixed, undergo a chemical reaction which creates heat. This heat is utilized to cure the thermosetting resin. The mixture of thermosetting resin and catalyst in supply line 16 and in the pot from which it is supplied may have an extended pot life in excess of one working day. Similarly, the pot life of the mixture of thermosetting resin and promoter in supply line 20 may be greater than one working day. However, when these two mixtures are intermixed by the sprays 17 and 21, the promoter and catalyst immediately generate heat so that the cure period may be in the range of minutes or even seconds. Means may be provided, such as valves in the supply lines, to regulate the amount of spray emitted by each of the nozzles. Since only a small amount of promoter is necessary to create the desired heat, the resin with which it is mixed may be considered as a diluent. Furthermore, the promoter is in a spray which is sandwiched between catalyzed resin layers from the sprays 17 and 25; and hence, the promoter is physically positioned to effect the greatest heat transfer.

The rate at which the resin will cure is determined by the concentration of the individual mixes. This invention contemplates the use of pigmenting the catalyzed resin in sprays 17 and 25 with one primary color dye and pigmenting the promoted resin mix in spray 21 with a different primary color dye. The sprays will intermix and produce a secondary color on the bonding surface 18. The secondary color produced will thus give an indication of the amounts of the different mixes and will aid in achieving the proper proportions.

Figure 2:
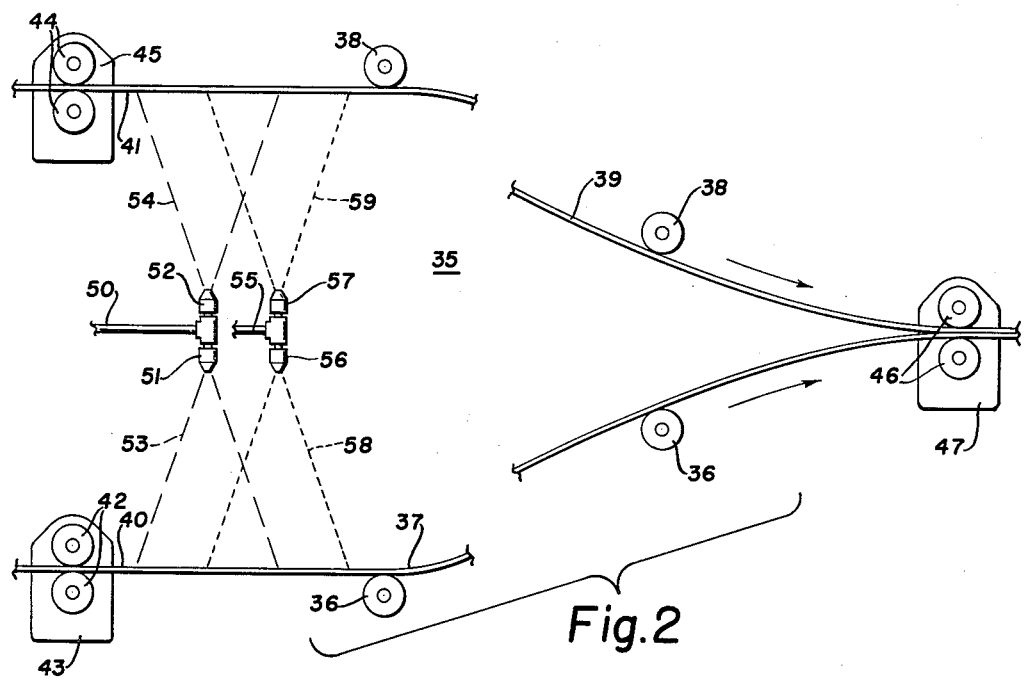
FIGURE 2 is a side view of a machine for bonding together two sheets.

FIGURE 2 shows a side view of a machine 35 which for purposes of illustration but not limitation has been shown as a machine for making two-ply plywood. This is illustrative of a machine and method for bonding together two sheets or surface films. The machine 35 has rollers 36 to support and guide a first sheet 37 and has rollers 38 to support and guide a second sheet 39. The sheet 37 has a facing surface 40, and the sheet 39 has a facing surface 41. Drive rollers 42 and drive means 43 are provided for the first sheet 37, drive rollers 44 and drive means 45 are provided for the second sheet 39, and drive rollers 46 and drive means 47 are provided for the combined sheets 37 and 39. The drive means 43, 45, and 47 are preferably synchronized so that there is no slippage on the drive rollers.

A supply line 50 supplies a mixture of thermosetting resin and catalyst to nozzles 51 and 52. Suitable resins and catalysts may be those which have been mentioned hereinabove. These nozzles emit sprays 53 and 54, respectively, to spray or coat the facing surfaces 40 and 41, respectively. A supply line 55 supplies a mixture of thermosetting resin and chemical promoter or accelerator to nozzles 56 and 57. The promoter may be the same as that which has been mentioned hereinbefore as emitted from nozzle 19 in FIGURE 1. These nozzles emit sprays 58 and 59 to coat the facing surfaces 40 and 41, respectively. The facing surfaces, having been coated with a catalyzed resin and a promoted resin, will generate heat by the mixture of the promoter and catalyst and are brought together by the drive rollers 46, preferably before a major portion of the exotherm has been completed. The drive rollers 46 insure tight engagement of the two sheets 37 and 39 to thereby bond together these sheets. It will be noted that the promoted resin is sandwiched between layers of catalyzed resin with the catalyzed resin in contact with the bonding surfaces 40 and 41. Thus, the sheet material 39, forms an air tight seal for the intermixed layers of promoted resin and catalyzed resin emitted by sprays 53, 54, 58, and 59, respectively.

FIGURE 3 shows a machine 62 which for purposes of illustration has been shown as a method of machine for bonding three-ply plywood. Elements of FIGURE 3 which are the same as those shown in FIGURE 2 have been given the same reference characters, and the description thereof will not be repeated. In this FIGURE 3 sheets 37 and 39 form the two outer layers of a three-ply plywood 63. A middle layer 64 is supported and driven by drive rollers 65 having drive means 66. A roller coater device 67 has been shown in this FIGURE 3 in section to better illustrate its parts. The roller coater device 67 has an upper roller 68 and which closely engages an opening 69 in a reservoir 70. The roller 68 thus picks up a layer of thermosetting resin and catalyst 71 in the reservoir 70 and coats the upper bonding surface 72 of the sheet 64. This catalyzed resin 71 may be thickened with any suitable thickener to better adapt it for roller coating rather than spray coating. Examples of suitable resins and catalysts have been described in conjunction with FIGURES 1 and 2.

The roller coater device 67 also includes a lower roller 75 which dips below the surface of the catalyzed resin 71 contained in a reservoir 76. Thus, the roller 75 picks up a surface coating of catalyzed resin and deposits it on the lower bonding surface 77 of the sheet 64. The sprays 53 and 54 again coat the bonding surfaces 40 and 41 with a catalyzed resin and then these bonding surfaces are covered by the sprays 58 and 59 with a promoted resin. Examples of promoters have been given hereinabove. When the three sheets are brought together by the drive rollers 46 into tight engagement, there will be a promoted resin layer 78 sandwiched between two catalyzed resin layers 79 between each pair of sheets, as best shown in the enlarged view of FIGURE 4. Thus, FIGURE 3, as well as FIGURES 1 and 2, shows a method and means for effecting a viscous air tight seal for the combined promoted resin and catalyzed resin so that a hard surface cure of the intermixed resins is effected without being in contact with the air.

The processes shown in FIGURES 1, 2, and 3 have been illustrated as continuous processes; but it will be obvious that the same method may be employed in piece work. The process is suited to a number of laminate requirements, such as glass fiber lay ups and waterproof veneer gluing or bonding as well as hard surfacing for long wear and weatherproofing of wood and metal surfaces. As shown in FIGURE 1, the thermosetting resin is on the outer surface of the sheet material, and this provides a surface which is exceedingly hard and moisture resistant to resist all forms of weathering and abrasion. The film 30 on the surface of FIGURE 1 need be only a few microns thick, yet it will form a viscous air tight seal. This film of styrene and chlorinated rubber may be washed off with solutions that do not affect the thermosetting resin hard surface. This film 30 is not visible and will wear off unnoticed by the user, or where no abrasion exists will remain for an indefinite period. The present invention makes it possible to employ thermosetting resins in all applications where paint or varnish were previously used, and hence, may be pigmented to the desired color. The invention as described in FIGURE 1 shows a method of bonding a sheet material 11 and a surface of a film 30 by the use of thermosetting resins.

In prior art methods of making waterproof plywood, urea glues were commonly used. Such process required the drying of the moisture out of the glue and required a large and costly heated press for this purpose. This has been true in practically all processes using a thermosetting resin which polymerizes by what is commonly referred to as a condensation type reaction. In this type of reaction a by-product such as water or hydrochloric acid is usually given off which must be gotten rid of. As a result, high pressures and costly press equipment have been required. In the present invention, there is no moisture or other material to be driven off since all materials of the thermosetting resin undergo a chemical change to create a hard bond. In other words the resins which this invention contemplates are those resins which polymerize without giving off objectionable by-products. The resin is also transparent and much stronger than urea glues, and, therefore, in waterproof plywood made by the present invention the bond line is thinner and practically unnoticeable. Also, in the exterior surfacing of plywood, or other porous substances, according to the process of FIGURE 1, the use of the film 30 creates a hard smooth surface, even though the surface of the plywood is rough. If the film 30 were not used, then the exterior surface cure of the resin would be incomplete, and also it would have a surface roughness generally in accordance with the roughness of the plywood.

For surfacing, as in FIGURE 1, an alternative process for use on plywood, or other porous substances, is to spray or otherwise cover the plywood first with the air tight seal 30. This seals the pores of the plywood so that less resin and catalyst mix need be used.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A machine having a front and a rear for bonding together two sheets, comprising, means for moving at least one of said sheets through said machine from the front to the rear thereof, a first and a second resin ejector in said machine, first and second mixtures of thermosetting resins chemically reactive together to create heat, means for dispensing said first and second mixtures from said first and second resin ejectors onto a facing surface of said one of said sheets to combine said mixtures to create heat, and means including the facing surface of the other one of said sheets to establish an air tight enclosure for said combined mixtures to heat and cure said resin mixes principally by said created reaction heat and thereby bond together said sheets.

2. The method of applying a coating to a surface, comprising, spraying said surface with a first mixture of polyester thermosetting resin and a catalyst, spraying said surface with a second mixture of a promoter and a diluent in a semi-overlapping relationship with said first mixture to intermix said resin, promoter, and catalyst and create sufficient heat for thermal cure in a relatively short time interval, and covering said combined first and second mixtures with a viscous air tight seal during the major portion of said time interval to exclude air from the outer surface of said combined mixtures and thus create a hard and completely cured outer surface on said combined mixtures.

3. A machine comprising, means for moving a sheet through said machine from a front end to a rear end thereof, first nozzle means to spray a surface of said sheet with a first mixture of a polyester thermosetting resin and catalyst near said front end, second nozzle means placed farther from said front end to spray said surface with a compatible polyester resin and a promoter in a semi-overlapping relationship with said first spray to intermix said catalyst and promoter and chemically create heat for curing, and means for covering said combined resins with a viscous air tight seal near said rear end of said machine and at a distance from said front end of said machine relative to the speed of movement of said sheet through said machine whereby a major portion of the exotherm cure effected by said created heat will occur subsequent to covering the combined resins on said sheet with said viscous air tight seal to complete said cure substantially in the absence of air to achieve a substantially complete cure not only of the interior but of both surfaces of said combined polyester resins.

4. The method of applying a thermosetting resin to a surface, comprising, spraying said surface with a first mixture of polyester thermosetting resin and a catalyst, spraying said surface with a second mixture of said resin and a chemical promoter in a semi-overlapping relationship with said first mixture to intermix said resin, promoter, and catalyst and create sufficient heat for thermal cure in a relatively short time interval, and establishing a sprayed viscous air tight seal for the combined first and second mixtures during the major portion of said time interval.

5. The method of bonding together first and second sheets movable along two generally parallel paths, comprising, coating the facing surfaces of the sheets with a mixture of thermosetting resin and catalyst, coating one of said surfaces with a mixture of a compatible resin and a promoter to intermix said promoter and catalyst and create heat for curing, and bringing together said facing surfaces of said sheets in tight engagement to establish a viscous air tight seal for the combined resins during the major portion of the exotherm cure established by said created heat.

6. A machine having a front and a rear for bonding together two sheets, comprising, means for moving said sheets through said machine from the front to the rear thereof, a first and a second resin ejector in said machine, first and second mixtures of thermosetting resins chemically reactive together to create heat, means for dispensing said first and second mixtures from said first and second resin ejectors onto surfaces of said sheets to combine said mixtures on at least one of said surfaces to create heat, and means including one of said sheets to establish an air tight enclosure for said combined mixtures to heat and cure said resin mixes principally by said created reaction heat and thereby bond together said sheets.

7. The method of surfacing a movable sheet, comprising, coating a face of said sheet with a first mixture of polyester heat curable resin and catalyst, coating said face with a second mixture of a compatible resin and a promoter to intermix said promoter and catalyst and create heat for curing, coating said face with a mixture similar to said first mixture, and coating said face with a mixture of chlorinated rubber and styrene to establish a viscous air tight seal during the major portion of the exotherm cure established by said created heat.

8. The method of surfacing a movable layer, comprising, spraying a face of said layer with a first mixture of polyester heat curable resin and catalyst, spraying on said face a second mixture of said resin and a promoter in a semi-overlapping relationship with said first mixture to intermix said promoter and catalyst and create heat for curing, spraying on said face said first mixture in a semi-overlapping relationship with said second mixture, and spraying on said face a mixture of chlorinated rubber and styrene to establish a viscous air tight seal for the combined sprays during the major portion of the exotherm cure established by said created heat.

9. A method of bonding at least two surfaces, comprising individually dispensing and spreading to combine on each of said bonding surfaces first and second chemically reactive thermosetting resins to form a reaction for generation of heat, and covering said combined first and second resins with an air tight seal whereby said reaction occurs in the absence of air to cure said resin and produce a bond.

10. The method of bonding together first and second sheets movable along two generally parallel paths, comprising, spraying on the facing surfaces of the sheets a first mixture of polyester heat curable resin and catalyst, subsequently spraying said facing surfaces with a second mixture of a compatible resin and a promoter in a semi-overlapping relationship with said first spray to intermix said promoter and catalyst and create heat for curing, and bringing together said facing surfaces of said sheets in tight engagement to establish a viscous air tight seal for the combined sprays during the major portion of the exotherm cure established by said created heat.

11. The method of bonding together first and second layers of plywood movable along two generally parallel paths, comprising, simultaneously spraying on the facing surfaces of the layers a first mixture of polyester heat curable resin and catalyst, subsequently spraying said facing surfaces simultaneously with a second mixture of said resin and a promoter in a semi-overlapping relationship with said first spray to intermix said promoter and catalyst and create heat for curing, said first and second sprays being pigmented with different primary colors to establish a secondary color in the combined first and second mixtures such that the shade of said secondary color will indicate the ratio of first and second mixtures, and bringing together said facing surfaces of said layers in tight engagement to establish a viscous air tight seal for the combined sprays during the major portion of the exotherm cure established by said created heat.

12. The method of bonding together first, second, and third sheets movable along generally parallel paths, comprising, coating the facing surfaces of said first and third sheets with a first mixture of polyester heat curable resin and catalyst, coating said facing surfaces with a second mixture of a compatible resin and a promoter to intermix said promoter and catalyst and create heat for curing, coating both surfaces of said second sheet with a mixture of a compatible resin and catalyst, and bringing together said sheets in tight engagement to establish a viscous air tight seal for the combined resin, catalyst, and promoter during the major portion of the exotherm cure established by said created heat.

13. The method of bonding together first, second, and third layers of plywood movable along generally parallel paths, comprising, simultaneously spraying on the facing surfaces of said first and third layers a first mixture of polyester heat curable resin and catalyst, subsequently spraying said facing surfaces simultaneously with a second mixture of said resin and a promoter in a semi-overlapping relationship with said first spray to intermix said promoter and catalyst and create heat for curing, said first and second sprays being pigmented with different primary colors to establish a secondary color in the combined first and second mixtures such that the shade of said secondary color will indicate the ratio of first and second mixtures, coating both surfaces of said second layer with a mixture of said resin and catalyst, and bringing together said layers in tight engagement to establish a viscous air tight seal for the combined resin, catalyst, and promoter during the major portion of the exotherm cure established by said created heat.

14. A machine for surfacing a sheet, said machine comprising, means for moving said sheet through said machine from a front end to a rear end thereof, first nozzle means to spray a surface of said sheet with a first mixture of thermosetting resin and catalyst near said front end, second nozzle means placed farther from said front end to spray said surface with a compatible resin and a promoter in a semi-overlapping relationship with said first spray to intermix said catalyst and promoter and chemically create heat for curing, third nozzle means to spray said surface with a mixture of a compatible resin and catalyst, and fourth nozzle means to spray said surface to form a viscous air tight seal thereon, said fourth nozzle means being disposed near said rear end of said machine and at a distance from said front end of said machine relative to the speed of movement of said sheet through said machine whereby a major portion of the exotherm cure effected by said created heat will occur subsequent to covering the mixtures on said sheet with said viscous air tight seal to complete said cure substantially in the absence of air to achieve a substantially complete cure not only of the interior but of both surfaces of said combined resins.

15. A machine for bonding together first and second sheets, said machine comprising, means for moving said sheets through said machine from a front end to a rear end thereof, individual input means for each of said sheets at the front end of said machine, roller means for guiding said sheets in generally parallel paths at the front end of said machine, first nozzle means to substantially simultaneously spray the facing surfaces of said sheets with a first mixture of thermosetting resin and catalyst near said front end, second means placed farther from said front end to coat said facing surfaces with a compatible resin and a promoter to intermix said catalyst and promoter and chemically create heat for curing, and means for bringing together said sheets near said rear end of said machine and at a distance from said front end of said machine relative to the speed of movement of said sheets through said machine such that only a minor portion of the exotherm cure effected by said created heat will have occurred prior to covering the mixture on said first sheet with the mixture on said second sheet as a viscous air tight seal.

16. A machine for bonding together first, second, and third sheets, said machine comprising, means for moving said sheets through said machine from a front end to a rear end thereof, individual input means for each of said first, second, and third sheets in that order at the front end of said machine, roller means for guiding said sheets in generally parallel paths at the front end of said machine, first nozzle means to substantially simultaneously spray the facing surfaces of said first and third sheets with a first mixture of thermosetting resin and catalyst near said front end, second nozzle means placed farther from said front end to substantially simultaneously spray said facing surfaces with a compatible resin and a promoter in a semi-overlapping relationship with said first spray to intermix said catalyst and promoter and chemically create heat for curing means to coat both surfaces of said second sheet with a third mixture of a compatible resin, catalyst and thickener, and means for bringing together said three sheets near said rear end of said machine and at a distance from said front end of said machine relative to the speed of movement of said sheets through said machine such that only a minor portion of the exotherm cure effected by said created heat will have occurred prior to covering the second mixture on said first and third sheets with said third mixture as a viscous air tight seal and whereby a major portion of the exotherm cure effected by said created heat will occur subsequent to covering the second mixture on said first and third sheets with said third mixture as a viscous air tight seal to complete said cure substantially in the absence of air to achieve a substantially complete cure not only of the interior but of both surfaces of said combined resins.

17. The method of bonding together first and second sheets movable along two generally parallel paths comprising spraying on the facing surfaces of the sheets a first mixture of polyester heat curable resin and catalyst, said catalyst being selected from the group consisting of methyl ethyl ketone peroxide, succinyl peroxide, benzoyl peroxide, tert-butyl perbenzoate, di-tert-butyl perphthalate, acetyl peroxide, peracetic acid, perbenzoic acid, toluyl peroxide, p-bromobenzoyl peroxide, anisoyl peroxide, chloracetyl peroxide, acetyl benzoyl peroxide, diacetyl peroxide, furoyl peroxide, di-isopropyl ozonide, di-isobutylene ozonide, tetralin hydro-peroxide, and 1-hydroxy-cyclopentyl-hydroperoxide-1, subsequently spraying said facing surface with a second mixture of a compatible resin and a promoter in a semi-overlapping relationship with said first spray to intermix said promoter and catalyst and create heat for curing, said promoter being cobalt naphthenate, and bringing together said facing surfaces of said sheets in tight engagement to establish an air tight seal for the combined sprays during the major portion of the exotherm cure established by said created heat.

18. The method of surfacing a movable layer comprising spraying a face of said layer with a first mixture of polyester heat curable resin and catalyst, said catalyst selected from the group consisting of methyl ethyl ketone peroxide, succinyl peroxide, benzoyl peroxide, tert-butyl perbenzoate, di-tert-butyl perphthalate, acetyl peroxide, peracetic acid, perbenzoic acid, toluyl peroxide, p-bromobenzoyl peroxide, anisoyl peroxide, chloracetyl peroxide, acetyl benzoyl peroxide, diacetyl peroxide, furoyl peroxide, di-isopropyl ozonide, di-isobutylene ozonide, tetralin hydro-peroxide, and 1-hydroxy-cyclopentyl-hydroperoxide-1, spraying on said face a second mixture of said resin and a promoter in a semi-overlapping relationship with said first mixture to intermix said promoter and catalyst and create heat for curing, said promoter being of the cobalt type, and spraying on said face a mixture of chlorinated rubber and styrene to establish an air tight seal for the combined sprays during the major portion of the exotherm cure established by said created heat.

19. The method of surfacing a movable member comprising spraying a face of said member with a first mixture of an unsaturated polyester resin and catalyst, spraying on said member a second mixture of an unsaturated polyester resin and a promoter in at least a partial overlapping relationship with said first mixture to intermix said promoter and catalyst and create heat for curing, and spraying on said first and second mixtures a third mixture which includes a rubber-type base to establish an air excluding cover for the combined sprays during the major portion of the cure established by said created heat.

20. The method of bonding together first and second members movable along two generally parallel paths comprising spraying on the facing surfaces of the members a first mixture of an unsaturated polyester resin and catalyst, subsequently spraying on said facing surface a second mixture of an unsaturated polyester resin and promoter in at least a partial overlapping relationship with said first spray to intermix said promoter and catalyst and create heat for curing, and bringing together said facing surfaces of said members to establish an air-tight seal for the combined sprays during the major portion of the cure established by said created heat.

References Cited in the file of this patent

UNITED STATES PATENTS

| | | |
|---|---|---|
| 2,251,295 | Sheesley | Aug. 5, 1941 |
| 2,420,720 | Pechukas et al. | May 20, 1947 |
| 2,439,157 | Chavannes | Apr. 6, 1948 |
| 2,487,254 | Mahoney | Nov. 8, 1949 |
| 2,495,175 | Nagel | Jan. 17, 1950 |
| 2,496,911 | Green | Feb. 7, 1950 |
| 2,502,340 | Pickens | Mar. 28, 1950 |
| 2,542,819 | Kropa | Feb. 20, 1951 |
| 2,557,826 | Keaton | June 19, 1951 |
| 2,591,768 | Austin | Apr. 8, 1952 |
| 2,615,820 | Schwoegler | Oct. 28, 1952 |
| 2,631,960 | Dafter | Mar. 17, 1953 |
| 2,640,799 | Grangaard | June 2, 1953 |
| 2,643,239 | Shokal et al. | June 23, 1953 |
| 2,662,576 | Pukacz | Dec. 15, 1953 |
| 2,748,028 | Richardson | May 28, 1956 |
| 2,780,496 | Asbeck | Feb. 5, 1957 |
| 2,788,337 | Preiswerk | Apr. 9, 1957 |
| 2,813,751 | Barrett | Nov. 19, 1957 |
| 2,829,006 | Johansson | Apr. 1, 1958 |

OTHER REFERENCES

"Tailor-Made Polyester Resin," Modern Plastics, October 1947, pages 111–115, page 114 particularly relied upon.